United States Patent
Pansare et al.

(10) Patent No.: US 12,489,959 B2
(45) Date of Patent: Dec. 2, 2025

(54) ENHANCED CONTENT PROTECTION FOR MEDIA SEGMENTS

(71) Applicant: Charter Communications Operating, LLC, St. Louis, MO (US)

(72) Inventors: Moin Pansare, Aurora, CO (US); Sachin Reddy Kota, Indian Land, SC (US); Vipul Patel, Parker, CO (US); Kei Foo, Englewood, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 197 days.

(21) Appl. No.: 18/511,993

(22) Filed: Nov. 16, 2023

(65) Prior Publication Data

US 2025/0168470 A1    May 22, 2025

(51) Int. Cl.
*H04N 21/845* (2011.01)
*H04L 9/30* (2006.01)
*H04N 21/2187* (2011.01)

(52) U.S. Cl.
CPC ........... *H04N 21/845* (2013.01); *H04L 9/302* (2013.01); *H04N 21/2187* (2013.01)

(58) Field of Classification Search
CPC ............. H04N 21/845; H04N 21/2187; H04N 21/2347; H04N 21/4627; H04N 21/23439; H04N 21/8456; H04L 9/302
USPC ....................................................... 709/219
See application file for complete search history.

(56) References Cited

U.S. PATENT DOCUMENTS

| | | | |
|---|---|---|---|
| 7,792,963 B2 | 9/2010 | Gould | |
| 8,055,678 B2 * | 11/2011 | Kim | ................ G06F 21/6227 713/153 |
| 2003/0056217 A1 | 3/2003 | Brooks | |
| 2006/0130107 A1 | 6/2006 | Gonder et al. | |
| 2007/0217436 A1 | 9/2007 | Markley | |
| 2009/0248794 A1 | 10/2009 | Helms | |
| 2010/0313236 A1 | 12/2010 | Straub | |
| 2017/0353516 A1 * | 12/2017 | Gordon | ................... H04L 65/80 |

OTHER PUBLICATIONS

Wikipedia, Digital rights management, downloaded Nov. 16, 2023 from https://en.wikipedia.org/wiki/Digital_rights_management, 32 pages.

(Continued)

*Primary Examiner* — Adil Ocak
(74) *Attorney, Agent, or Firm* — Otterstedt & Kammer PLLC

(57) ABSTRACT

Obtain, at a first network location, a first file specifying a first plurality of file segments, having a first plurality of original file segment names, to be obtained from a second network location. At the first network location, map each of the first plurality of original file segment names to a first plurality of modified file segment names. Send, from the first network location to the second network location, requests for each of the first plurality of modified file segment names. Obtain, at the first network location from the second network location, the first plurality of file segments, corresponding to the first plurality of original file segment names, based on the requests for each of the first plurality of modified file segment names and the mapping.

31 Claims, 13 Drawing Sheets

(56) References Cited

OTHER PUBLICATIONS

Wikipedia, Manifest file, downloaded Nov. 16, 2023 from https://en.wikipedia.org/wiki/Manifest_file, 3 pages.
Wikipedia, MPEG Common Encryption, downloaded Nov. 16, 2023 from https://en.wikipedia.org/wiki/MPEG_Common_Encryption, 1 page.
Wikipedia, Random number generation, downloaded Nov. 16, 2023 from https://en.wikipedia.org/wiki/Random_number_generation, 11 pages.
Wikipedia, RSA (cryptosystem), downloaded Nov. 16, 2023 from https://en.wikipedia.org/wiki/RSA_(cryptosystem), 19 pages.

* cited by examiner

| ORIGINAL SEGMENT NUMBER | MAPPED SEGMENT NUMBER |
|---|---|
| 1 | 1892 |
| 2 | 342 |
| 3 | 4534 |
| 4 | 9765 |

ENHANCED CONTENT PROTECTION FOR MEDIA SEGMENTS

FIELD OF THE INVENTION

The present invention relates generally to the electrical, electronic and computer arts, and, more particularly, to content management and security.

BACKGROUND OF THE INVENTION

Internet protocol (IP) video streaming has gained popularity as consumers' preferred way to consume video content. As the shift from traditional cable television (CATV) to IP video streaming has occurred, securing video delivered via an IP network has become more important. Bad actors, however, have found ways to reverse engineer systems to discern the IP video delivery workflow and exploit vulnerabilities that may exist in the system to illegally access video content. In an effort to ensure that video content and segments destined for delivery to customer end devices are secure, industry best practices are deployed, including the use of Digital Rights Management (DRM) systems which provide licenses containing DRM encryption key information needed for the customer device to decrypt the video segments that are to be displayed on the screen.

While DRM has generally been successful in protecting video content, DRM has its own challenges. For example, a specific type of DRM must be used for a specific device. Namely, Apple's FairPlay® DRM must be used with Apple devices and Safari® browser (marks of APPLE INC. Cupertino CALIFORNIA, USA), Google's Widevine® DRM must be used with Google's Android® devices and Chrome® browser (marks of GOOGLE LLC Mountain View CALIFORNIA, USA), and Microsoft's PlayReady® DRM must be used with PlayReady® enabled devices and Internet Explorer™ and/or EDGE browsers (marks of Microsoft Corporation Redmond WASHINGTON, USA). While Common Encryption (CENC) was created to combine Google's Widevine® DRM and Microsoft's PlayReady® DEM to reduce the variance in solutions, currently, there is no single, universal DRM that will work with all device types and browser types. Furthermore, bad actors still find ways to exploit potential vulnerabilities of conventional DRMs.

SUMMARY OF THE INVENTION

Principles of the invention provide enhanced content protection for media segments. In one aspect, an exemplary method includes the operations of obtaining, at a first network location, a first file specifying a first plurality of file segments, having a first plurality of original file segment names, to be obtained from a second network location; at the first network location, mapping each of the first plurality of original file segment names to a first plurality of modified file segment names; sending, from the first network location to the second network location, requests for each of the first plurality of modified file segment names; and obtaining, at the first network location from the second network location, the first plurality of file segments, corresponding to the first plurality of original file segment names, based on the requests for each of the first plurality of modified file segment names and the mapping.

In another aspect, another exemplary method includes the operations of making available, from a second network location to a first network location, a first file specifying a first plurality of file segments, having a first plurality of original file segment names, to be obtained by the first network location from the second network location; obtaining, from the first network location at the second network location, requests for each of a first plurality of modified file segment names, the first network location having mapped each of the first plurality of original file segment names to the first plurality of modified file segment names; responsive to the second network location obtaining the requests for each of the first plurality of modified file segment names from the first network location, the second network location de-mapping, for the first plurality of file segments, the first plurality of modified file segment names back to the first plurality of original file segment names; and based on the de-mapping, the second network location sending to the first network location the first plurality of file segments with the first plurality of original file segment names.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a non-transitory machine-readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps (or a system wherein one or more such apparatuses are networked together, optionally with one or more other components). Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention provide one or more of:

a content security mechanism compatible with a variety of device types, browser types, and the like;
  at least some measure of security even in a case where the DRM protection of content has been defeated.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

As noted, Internet protocol (IP) video streaming has gained popularity as consumers' preferred way to consume video content. As the shift from traditional cable television (CATV) to IP video streaming has occurred, securing video delivered via an IP network has become more important. Purely by way of example and not limitation, some embodiments will be shown in the context of a cable multi-service operator (MSO) providing data services as well as entertainment services. It will be appreciated that in such a context, conventional CATV video delivery is possible, as well as IP video streaming over the data services. However, this is a non-limiting example, and embodiments can be implemented in a variety of contexts where IP data communication is available.

Figure 1:
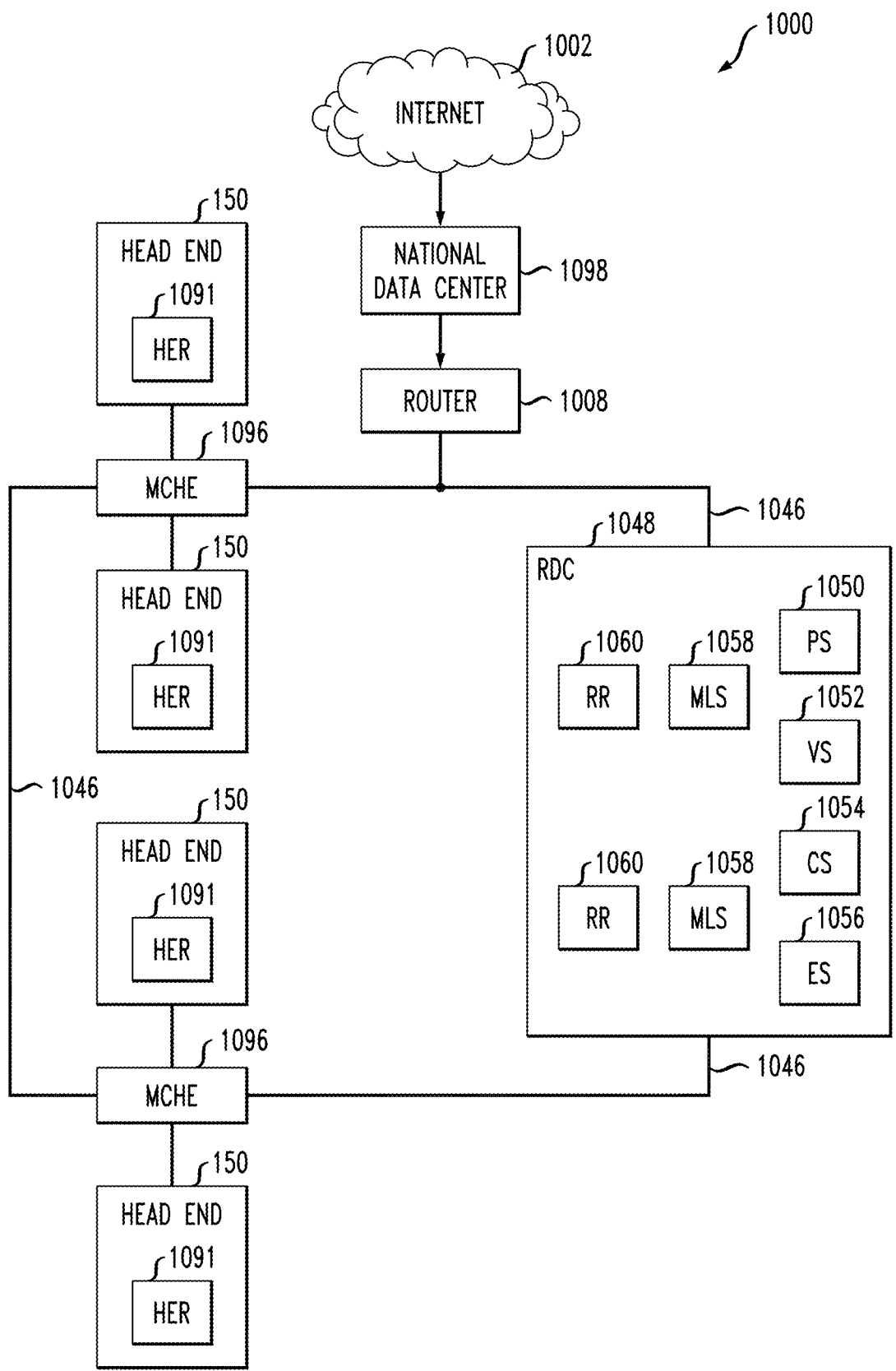
FIG. 1 is a block diagram of an exemplary embodiment of a system, within which one or more aspects of the invention can be implemented.

FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area(s). In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, California, USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
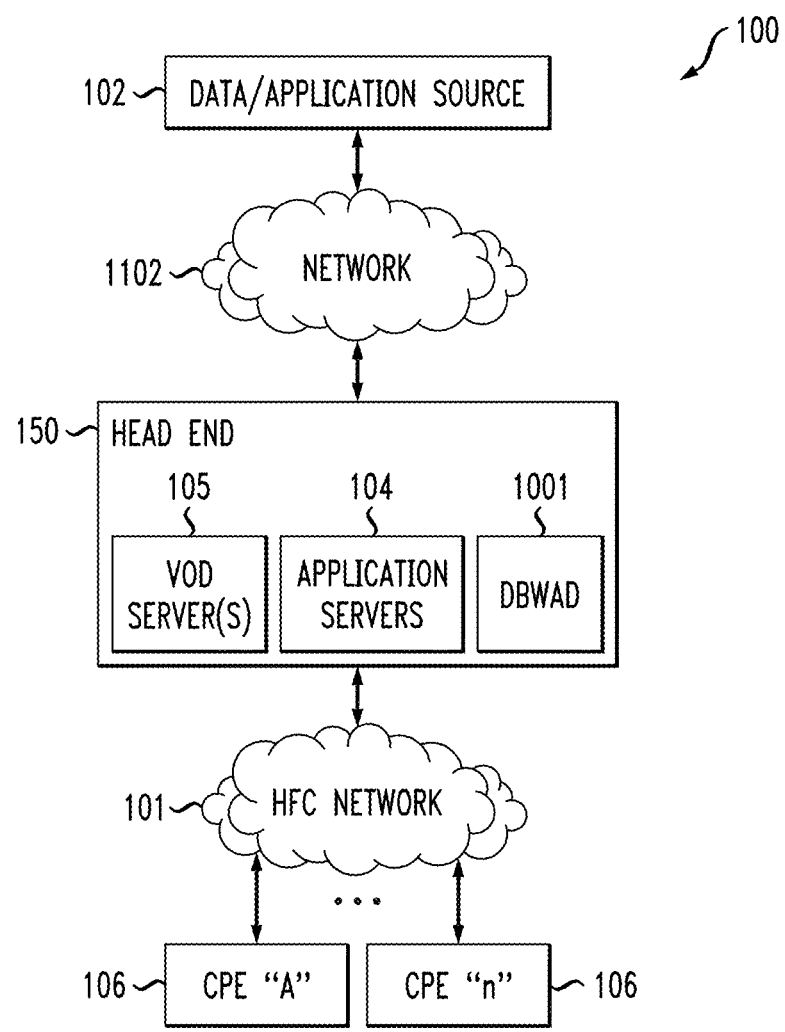
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ Service ONUs (S-ONUs; ONU=optical network unit) as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third-party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g., FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
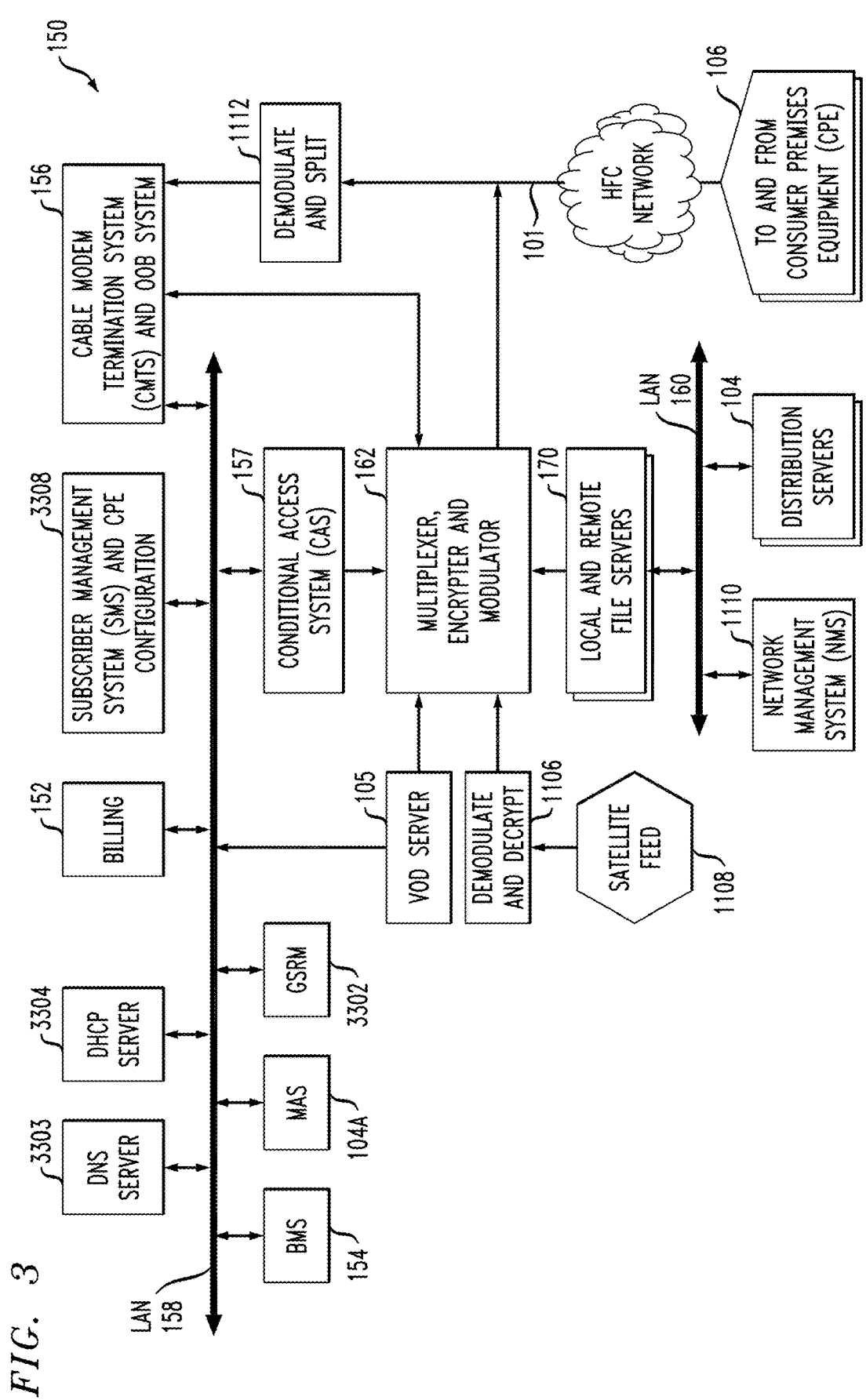
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville CO 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV)

system. It is employed by many cable television operators to provide Internet access (cable Internet) over their existing hybrid fiber-coaxial (HFC) infrastructure. HFC systems using DOCSIS to transmit data are one non-limiting exemplary application context for one or more embodiments. However, one or more embodiments are applicable to a variety of different kinds of networks.

It is also worth noting that the use of DOCSIS Provisioning of EPON (Ethernet over Passive Optical Network) or "DPoE" (Specifications available from CableLabs, Louisville, CO, USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

It should be noted that the exemplary architecture in FIG. 3 shows a traditional location for the CMTS 156 in a head end. As will be appreciated by the skilled artisan, CMTS functionality can be moved down closer to the customers or up to a national or regional data center or can be dispersed into one or more locations.

Figure 4:
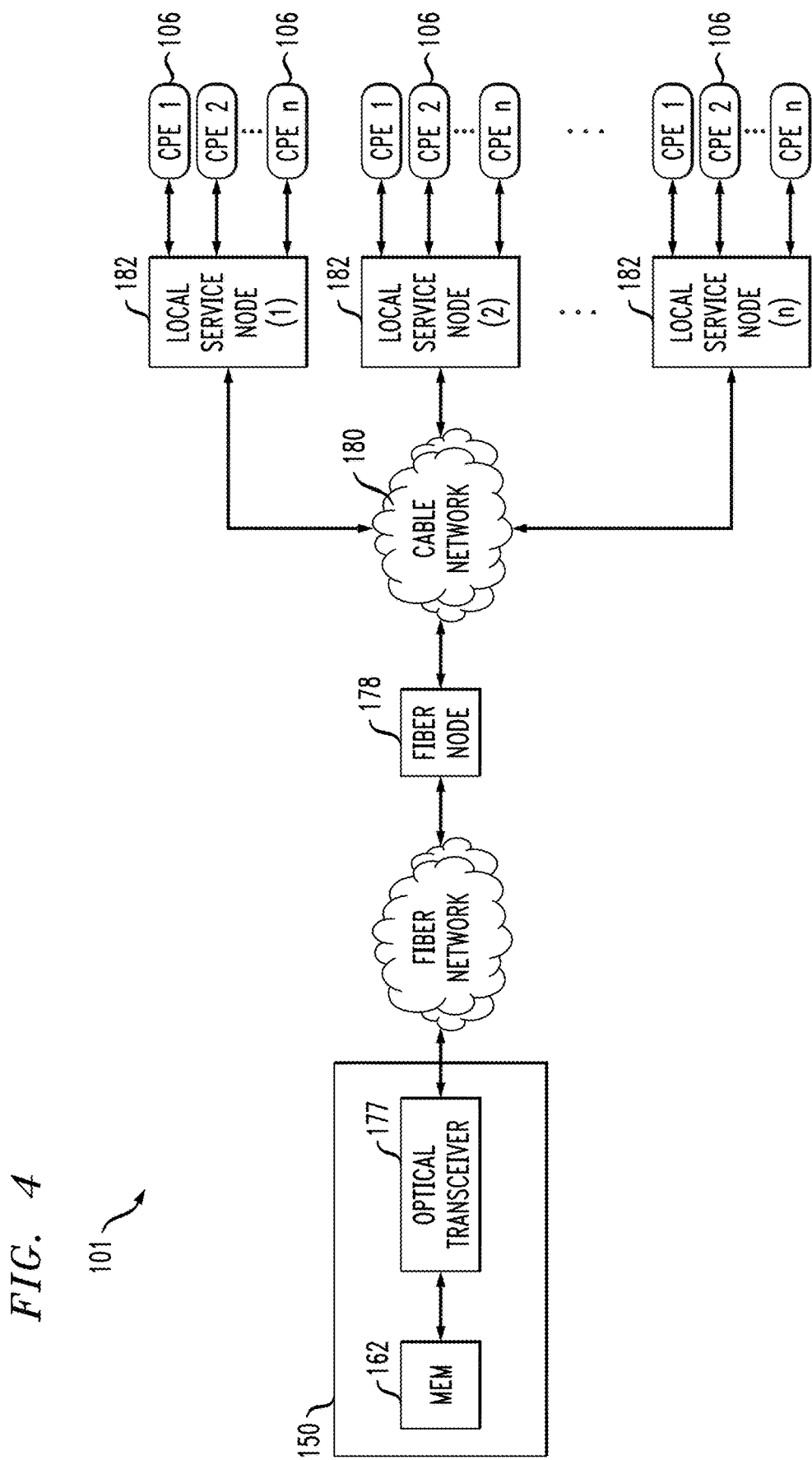
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network 179 to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed. It should be understood that embodiments of the invention have broad applicability to a variety of different types of networks. Some embodiments relate to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
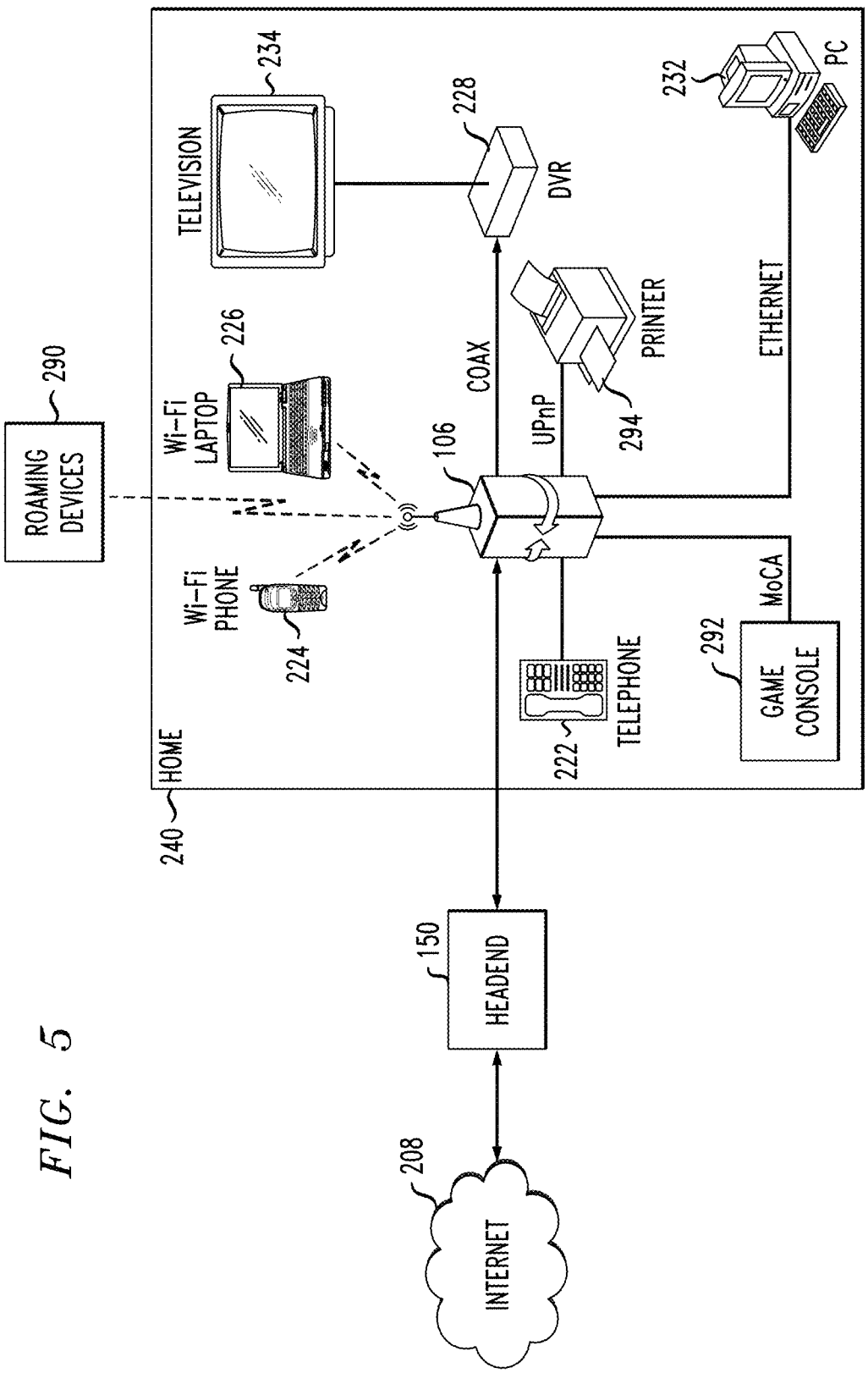
FIG. 5 is a functional block diagram of a premises network, including an exemplary centralized customer premises equipment (CPE) unit, interfacing with a head end such as that of FIG. 3.
Figure 6:
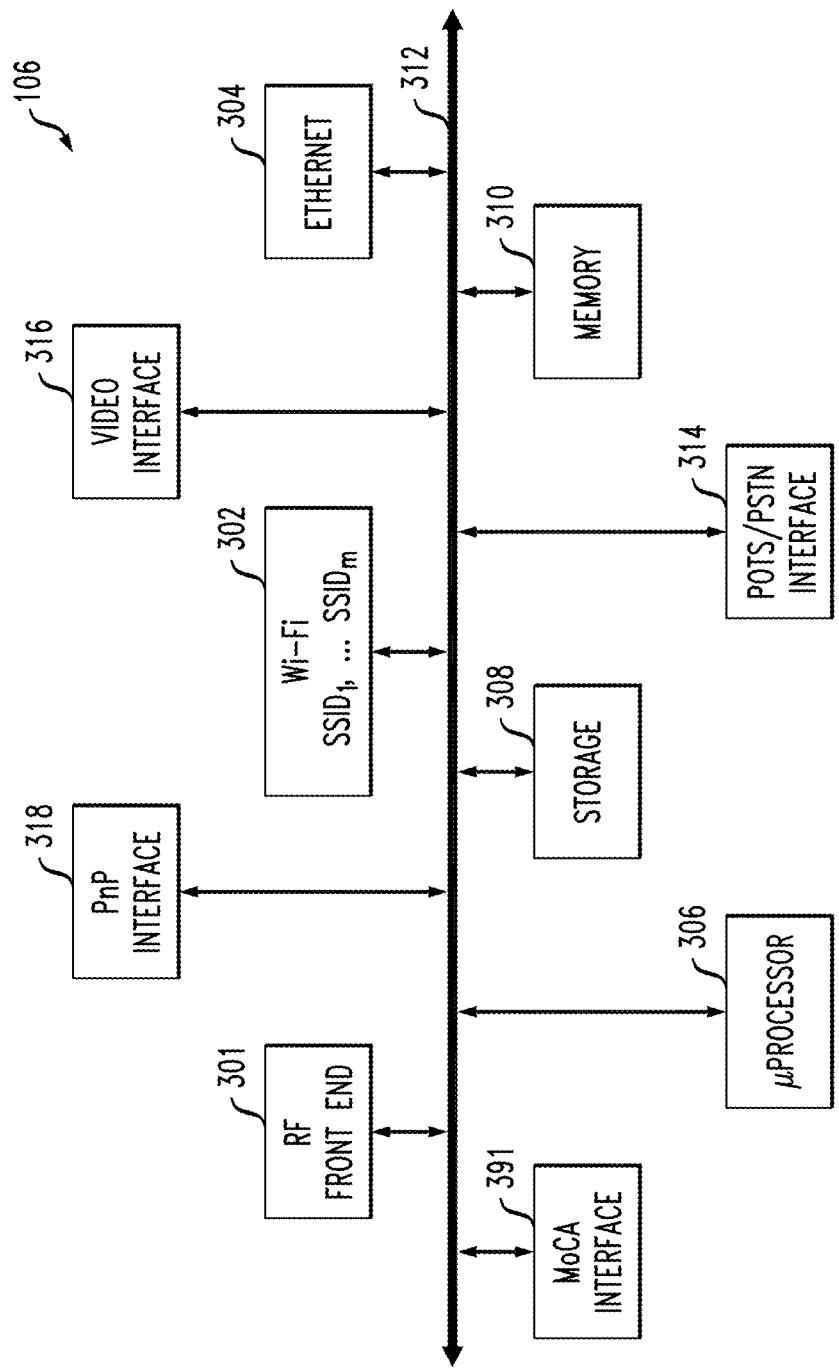
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment-see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example, over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VOIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random-access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g., the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g., Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
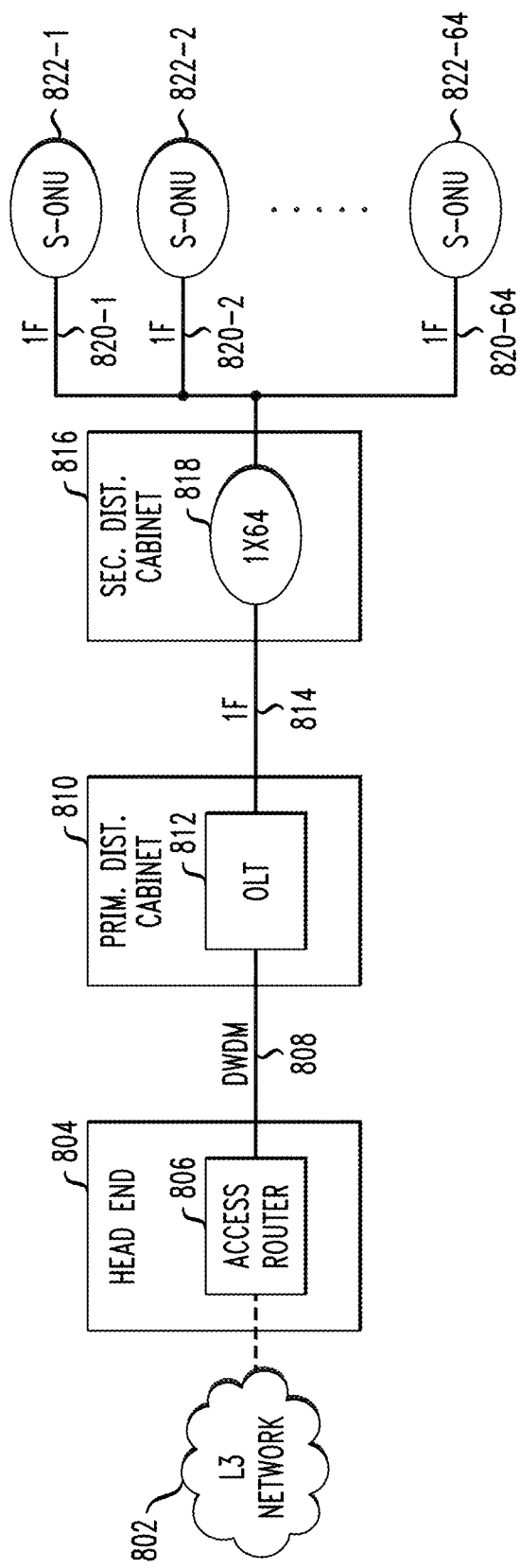
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
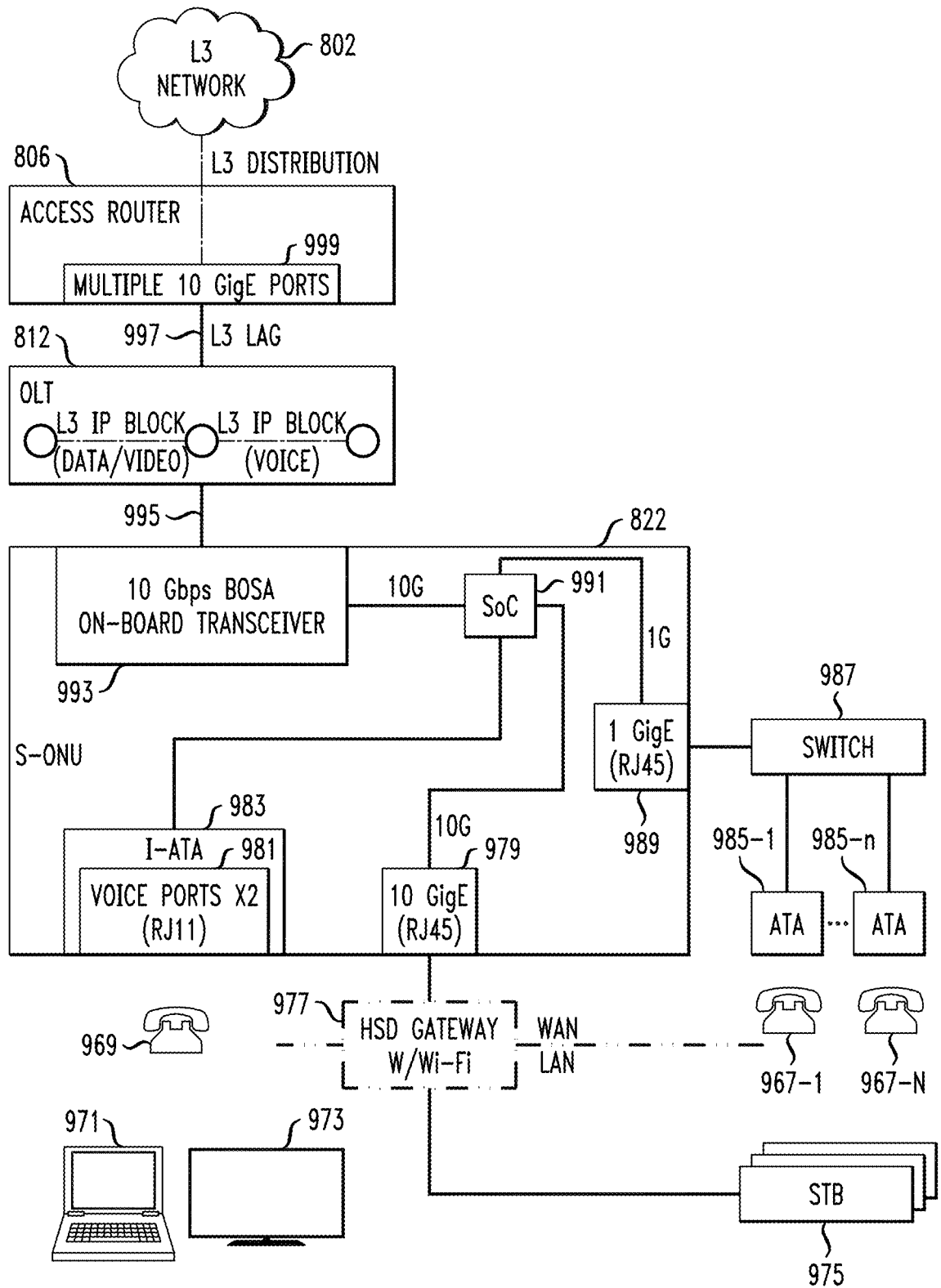
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical subassembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-n, suitable for the needs of the business, via external analog telephone adapters (ATAs) 985-1 through 985-n. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 can, if desired, also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve. Furthermore, one or more embodiments could be adapted to situations where a cable/fiber broadband operator provides wired broad band data connectivity but does not provide QAM-based broadcast video.

Principles of the present disclosure will be described herein in the context of apparatus, systems, and methods for enhanced content protection. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

Generally, techniques for enhanced content protection are disclosed; in one or more embodiments, such techniques make exploitation by bad actors difficult or impossible. In one example embodiment, a manifest file is obtained at a video player and a video segment number corresponding to a given video segment is encrypted within the player (aspects of the invention are not limited to video segments but are generally applicable to media segments and other appropriate types of file segments). In one example embodiment, the manifest file contains descriptions and details instructing a video player or similar device regarding how to display the corresponding video content. While the format of the manifest file may differ for different stream types, every type of device and browser typically inherently follows the instructions from the manifest file to display the video content. The manifest files are continuously updated to provide continuous video streaming (as will be familiar to the skilled artisan, the manifest file typically holds a specification of segments for a short time period of live video content and is continuously updated as the watching of the live video progresses). One or more embodiments provide light-weight techniques that advantageously operate uniformly across many different device types and content browsers since there is no need to rely on a specific proprietary encryption scheme, but rather resequencing/shuffling is built right into the player 2008 using module 2007 (see discussion below).

In general, a manifest file is referred to as a reference file and specifies the different tracks of audio, video, text and captions associated with a given video segment (again, more generally, a media segment). Using the manifest file, the player formulates the track types that the player supports based on certain parameters and selects the corresponding video tracks for the video to be played. Once this selection is made, segment requests are submitted to the backend system specified in the manifest file (that is, the backend system that has access to the video to be played). The requested sequence of video segments constitutes the buffer (i.e., the contents thereof) which is fed to the player to facilitate successful playback of the video. For example, referring to FIG. 10, if the manifest file specifies segments 1-10, these segments are fetched and added to the buffer in the proper sequence to enable playback. This information or sequence of files can be observed in a developer console as well; for example, when debugging on a specific platform. In a non-limiting example, the segments can be on the order of two seconds and about 18-20 seconds of video can be buffered.

Figures 10, 11:
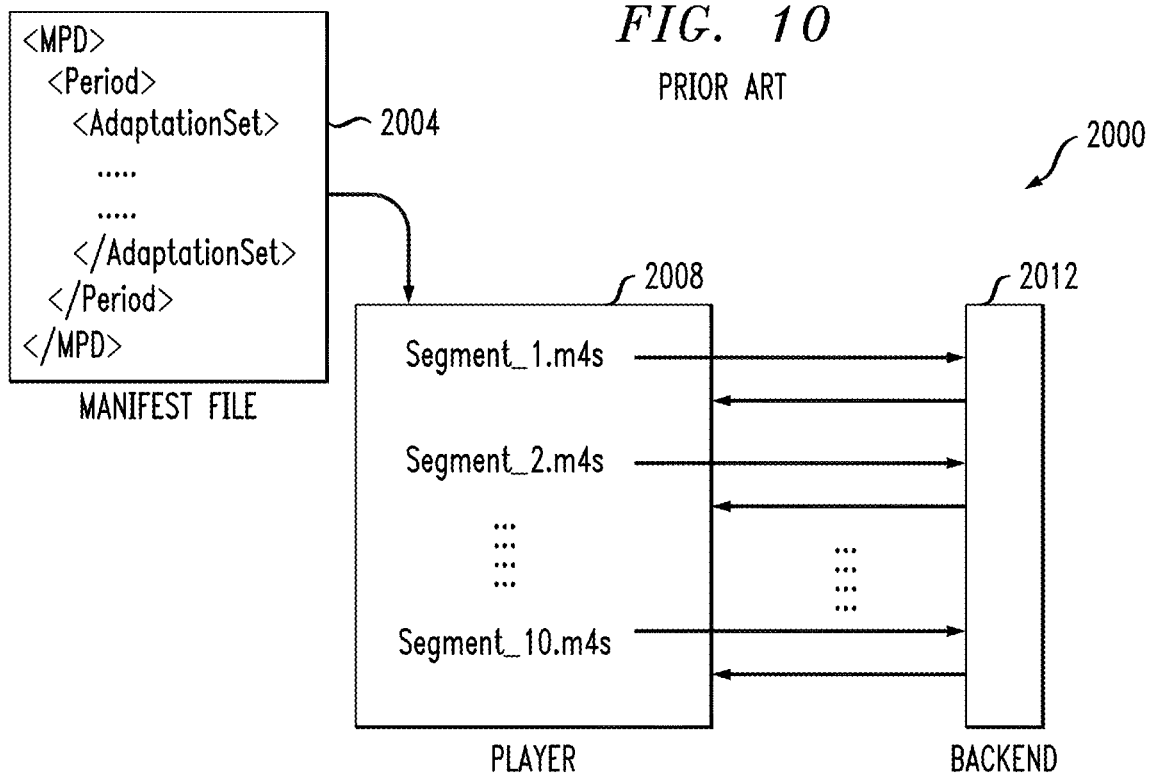
FIG. 10 is a workflow for playing video content, as known from the prior art.
FIG. 11 is a table illustrating an example mapping for four segments, in accordance with an example embodiment.

FIG. 10 is a workflow 2000 for playing video content, as known from the prior art. A manifest file 2004 is accessed to identify the video segments to provide to a client device 2008. As illustrated in FIG. 10, a given video is played by providing a sequence of segments, including segment_1.m4s through segment_10.m4s in sequential order, to the client device 2008. To play properly, the segments need to be played in the proper order by requesting the segments from backend system 2012, in sequential order from segment_1.m4s through segment_10.m4s.

In contrast, one or more exemplary embodiments provide a "scrambling" approach to scramble the sequence of segment requests. By effectively scrambling the sequence of segment requests (identifiers), it becomes extremely difficult or borderline impossible for unauthorized external platforms to re-create the original sequence of segments, and only trusted platforms in accordance with embodiments of the invention have the capability to request the right video segment at the right time to facilitate the proper playback of the given video.

Advantageously, one or more embodiments map a segment number to a different segment number in a fashion such that only trusted players/systems are able to generate/reverse the same mapped-sequence and respond to the mapped sequence with the correct segment.

Figure 12:
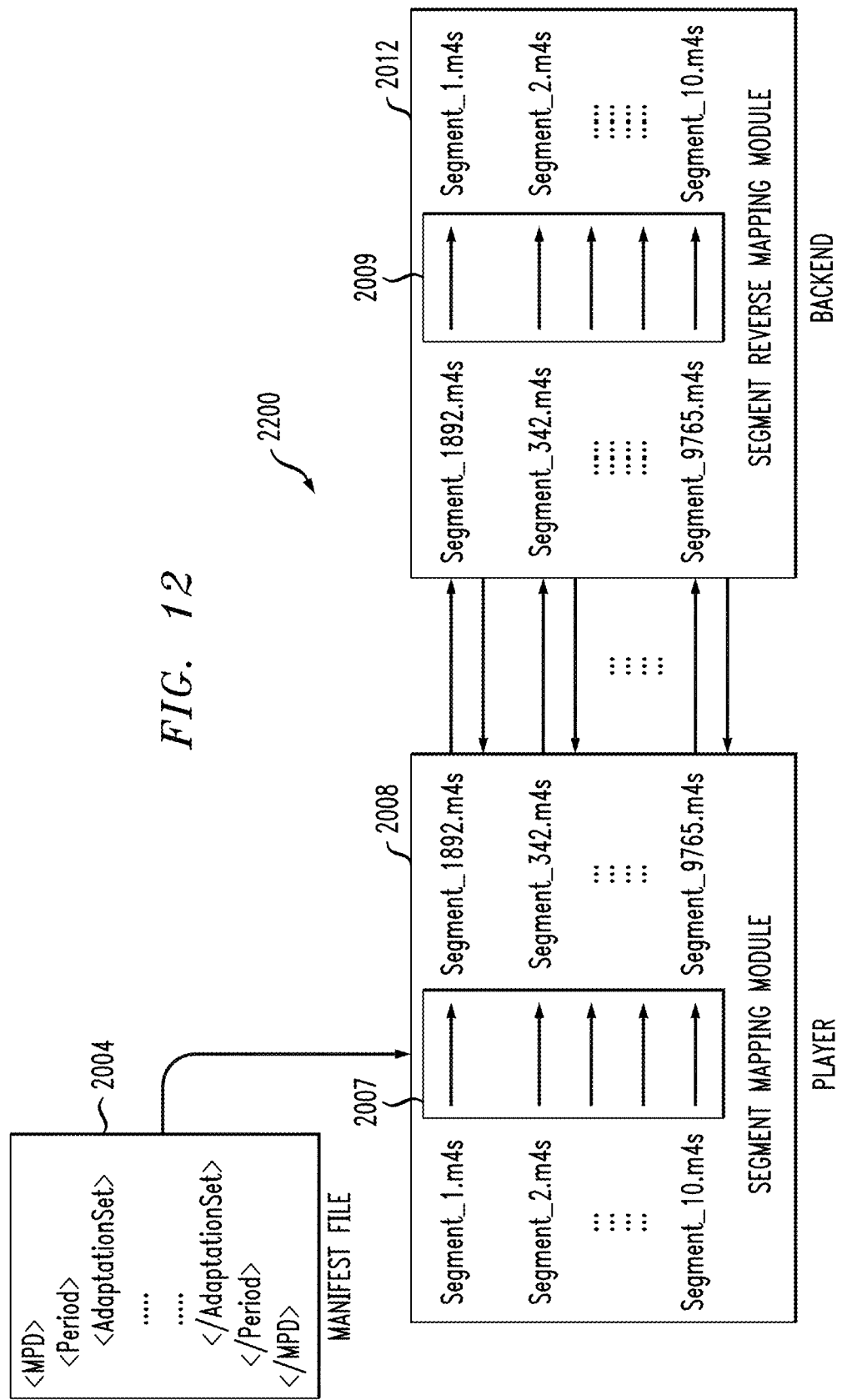
FIG. 12 is a workflow for playing video content using segment mapping, in accordance with an example embodiment.

Refer now to the table of FIG. 11 and to FIG. 12-FIG. 11 is a table illustrating an example mapping for four segments, in accordance with an example embodiment, and FIG. 12 is a workflow for playing video content using segment mapping, in accordance with an example embodiment. In FIG. 12, the player 2008 includes a segment mapping module 2007 and the backend 2012 includes a segment reverse mapping module 2009; modules 2007, 2009 are discussed further below. Consider, for example, segment_1.m4s of FIG. 12. In this case, the segment number '1' is extracted and converted to a new number (such as '1892') by the segment mapping module 2007 using a mapping technique, such as RSA or another encryption technique. Following the mapping, a request is made from the player to the backend for segment_1892.m4s rather than segment_1.m4s. The segment reverse mapping module 2009 of the backend system 2012 has the capability to convert this mapped segment number back to the original segment identifier; i.e. a request for segment_1892.m4s is converted back to a request for segment_1.m4s, and the backend system 2012 responds with the latter (appropriate) segment.

A pertinent characteristic of the mapping mechanism is that, for numbers that were originally consecutive, the mapped numbers are not in sequence, thereby making any attempt to reverse-engineer the sequence extremely difficult. As noted, FIG. 11 is a table illustrating an example mapping for four segments, in accordance with an example embodiment. As illustrated in the table of FIG. 11, original segment numbers 1, 2, 3, and 4 are mapped to segment numbers 1892, 342, 4534, and 9765, respectively. This makes guessing the segment identifiers extremely difficult. The mapped sequence number is sent from the player to the back end which converts it back to the original sequence number.

To reiterate, FIG. 12 is a workflow 2200 for playing video content using segment mapping, in accordance with an example embodiment. The client device 2008 accesses the manifest file 2004 which identifies the original sequence of video segments. The segment mapping module 2007 of the client device 2008 maps the original sequence of video segments to a new sequence. Thus, to obtain segment_1.m4s, the mapping module 2007 maps the segment_1.m4s to segment_1892.m4s and submits a request to the backend system 2012 to retrieve segment_1892.m4s. The segment reverse mapping module 2009 of backend system 2012 maps the request for video segment_1892.m4s back to a request for video segment_1.m4s and transfers segment_1.m4s to the client device 2008. The client device 2008 continues submitting mapped requests to the backend system 2012, the segment reverse mapping module 2009 maps the received request back to the original segment identifier and the backend system 2012 transfers the segment corresponding to the original segment identifier back to the client device 2008.

Consider an example of unauthorized access prevention. Suppose an illicit video player makes a request for the first segment of the video (segment_1.m4s) to a backend system 2012. The backend system 2012 converts '1' to '5646' (dependent on the reverse mapping algorithm). The backend attempts to respond to the request with the segment_5646.m4s file. In a typical case, such a segment does not exist at the backend, and the result is a playback failure with a 404 error. If such a segment did exist, it would not correspond to the correct first segment of the video, and in either case, the video would not play properly (or at all). Even in the worst-case scenario, where a bad actor is somehow able to guess, once, the segment number which is in the live window (i.e., the segment number of the segment that is in the live window) and/or one segment of the video actually exists in the backend, the bad actor would still have to predict the subsequent segment mapping correctly in order to have successful continuous playback. The bad actor would have to know the exact conversion method/algorithm used to originally map the segment numbers to make valid segment requests to ensure continuous playback.

One or more embodiments rely on a small number of video segments being saved in the backend system 2012 and leveraging the player properties of continuous playback to prevent unauthorized access. In this context, the skilled artisan will understand the significance of a "small" number of video segments—this aspect relates to why one or more embodiments are especially advantageous with "live" video. The number of video segments is "small" because with live video, the system usually tries to maintain on the order of 36 seconds of content and keeps moving the content forward. In one or more embodiments, the back end maintains that amount of video and perhaps a little bit more. In one or more embodiments, the back end acts as a cache so that multiple clients can efficiently obtain the data (i.e., video segments).

In one or more embodiments, the back end holds only the video segments published in the current playlist. Content (segments) that needs to be fetched by the users is available, but the full content is usually not published to the players. Consider, for example, a live broadcast, starting at index 1, and continuing as long as the live stream is being sent. The manifest file only represents a small subset of the segments; say, 5 or 10. In a non-limiting example, 18 2-second segments are included, corresponding to a 36 second window. As that 36 second window moves forward, as long as the (live) stream is active, the earlier segments are continuously flushed out so as to prevent unnecessary storage on the back end server. Attempts to retrieve older segments will result in a 404 error, since the old segment will have been deleted. This aspect adds to security because only a small number of segments are even available for a bad actor to attempt to access. One or more embodiments are thus particularly beneficial for live video as opposed to VOD, because in VOD, all the video segments typically need to be saved. As used herein, "live" video includes video emanating from a TV camera in real time (or with a slight time delay to permit blooping out profanity or the like) ("real time video") as well as scheduled broadcast video which is presented from a recording at a predetermined time (such as in accordance with an electronic program guide; e.g., airing Mondays at 8 PM Eastern time) as opposed to on-demand ("pre-recorded broadcast video").

Experiments have been conducted using an exemplary embodiment with RSA as the mapping algorithm and tested on live playback to validate feasibility.

In one or more embodiments, the player is an application ("app") running on a smart phone, laptop, desktop, or the like that allows a user to watch internet-protocol television (IPTV) (see FIG. 13 and corresponding discussion below). The skilled artisan will be familiar with such apps; a non-limiting example is the Spectrum® TV App available from Charter Communications, Inc., Stamford, CT, USA (SPECTRUM is a registered mark of CHARTER COMMUNICATIONS HOLDING COMPANY, LLC ST. LOUIS MISSOURI USA). In one or more embodiments, the back-end is implemented as a packager 2099 plus a file server (also known as an origin server) 2097. See FIGS. 14A-14C. In this aspect, an external component called a packager 2099 generates the segments and the manifest and provides them to the file server or origin server 2097 for public access. The file server or origin server 2097 then serves out to the player, as IP packets, both the manifest file and the segments referenced therein. In FIG. 14A, the module 2009 is located in the origin server 2097. In FIG. 14B, the module 2009 is located in the packager 2099. In FIG. 14C, the module 2009 is located external to the server 2097 and packager 2099 but is in data communication with one or both of them.

In one or more embodiments, the segment mapping module 2007 is implemented as software running on a smart phone or the like, implementing RSA or another encryption algorithm or modification function. The segment mapping module 2007 hooks into the player app via an API or the like. The API endpoint intercepts/receives and modifies the segment requests. In one or more embodiments, the reverse mapping module 2009 is similarly implemented as decryption software on the back end server with API hooks into the existing back end software. The skilled artisan in the field of IPTV is familiar with the existing back-end programs.

RSA is a non-limiting example of encryption. Furthermore, techniques other than encryption can be employed-any suitable modification function can be employed. In a non-limiting example, just add a letter or number to the segment—this is not encryption per se, but rather modifies the content of the URL/segment request from the manifest. In another aspect, a random number generator could be employed, where the request is incremented/decremented by the random number. The random number could be shared with the back end to carry out "decryption" (i.e., two random number generators using the same seed value could be employed as discussed further below). Alternatively, when writing the segments onto the file server, the packager can just rename them while the write operation is performed. In this aspect, shown in FIG. 14B, the module 2009 is located on the packager instead of the file server/origin server. Thus, the module 2009 can be on the packager, on the file server/origin server, partly on the packager and partly on the file server/origin server, or at some other location in the back end or accessible to the back end, as in FIG. 14C. At least one component in the back end, or at least in communication with the back end, will know the decryption/de-shuffling technique.

Figure 15:
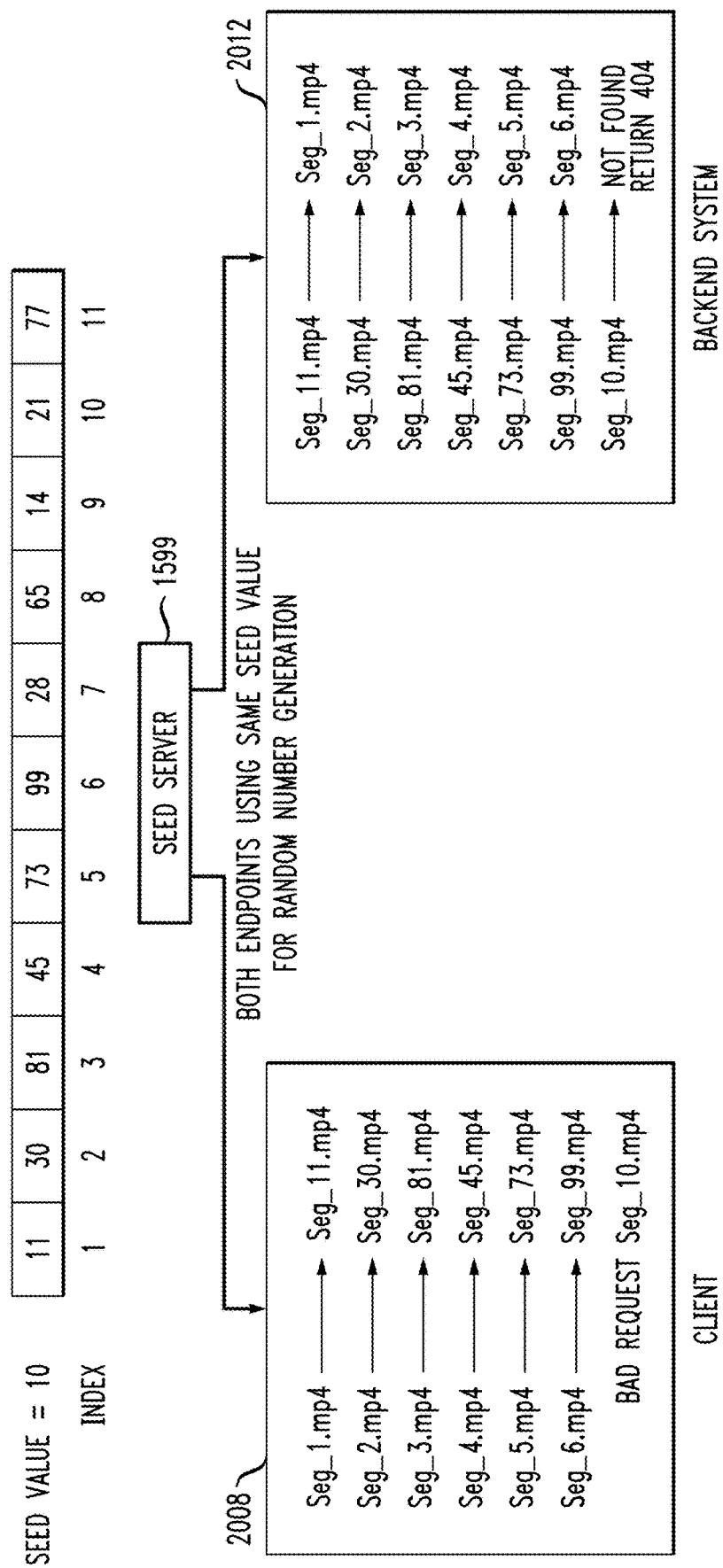
FIG. 15 shows exemplary use of a random number generator (RNG) for mapping, in accordance with aspects of the invention.

FIG. 15 shows exemplary use of a random number generator (RNG) for mapping, in accordance with aspects of the invention. If a random number generator (RNG) is given the same seed value, the output list of random numbers is always the same. For example, if there is a certain RNG and a seed value of ten is input, the output may be, for example, 11, 30, 81, 45, 73, 99, 28, 65, 14, 21, 77. Whenever the same seed is input to the RNG, the output result will be the same. On the other hand, if the seed value is changed from, say, 10 to 11, the output of the RNG can be totally different. In FIG. 15, for example, a seed server 1599 shares the identical seed value (here, 10) with both the client 2008 and backend 2012. Both endpoints are synchronized with the server that provides the seed value and accordingly use the same seed value for random number generation. The client and backend can each have an identical RNG (for example, referring to FIG. 12, in the mapping module 2007 and in the reverse mapping module 2009). In client 2008, there are segments Seg_1 to Seg_6. The segment name is converted as shown based on the random number generated at the corresponding index. The converted names are similarly reverse-mapped back. An improper request for Seg_10 results in a 404 error. Seed server 1599 can be located anywhere that it can communicate with the player and back end, such as within the ISP's network or in the cloud.

Figure 13:
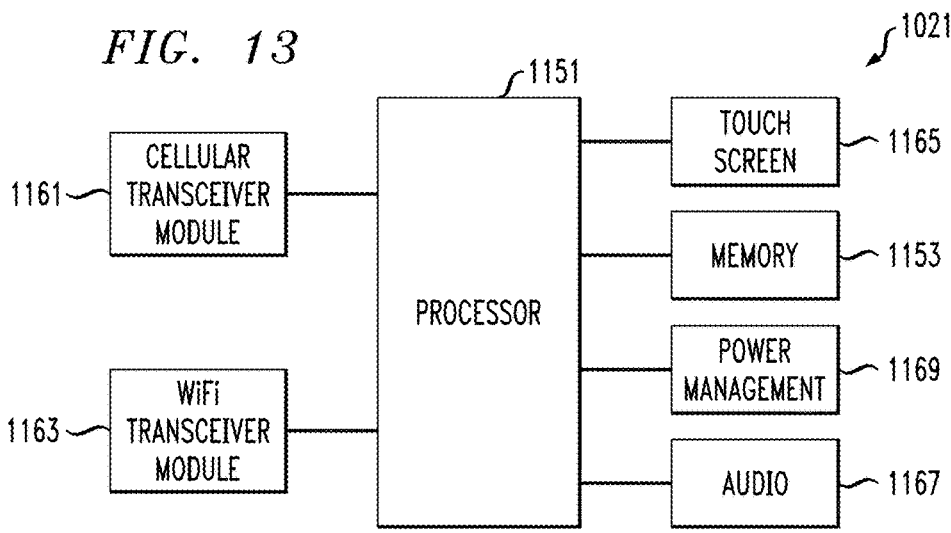
FIG. 13 is a block diagram of a "smart" cellular telephone useful in connection with one or more aspects of the invention.
Figure 14A:
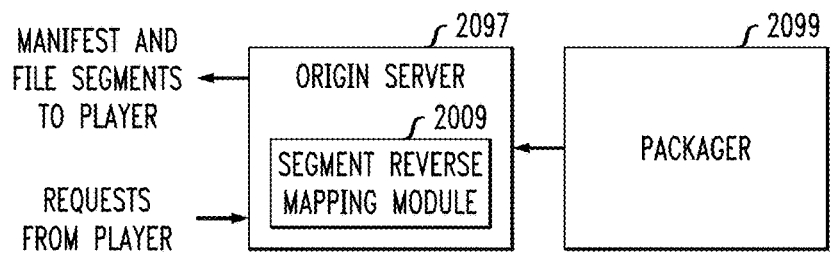
FIGS. 14A, 14B, and 14C show exemplary aspects of a backend, in accordance with aspects of the invention.
Figure 14B:
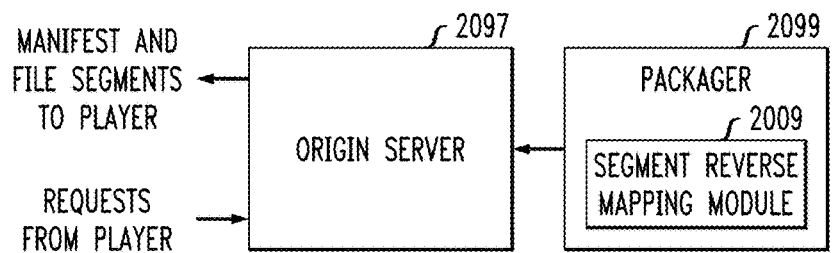
Figure 14C:
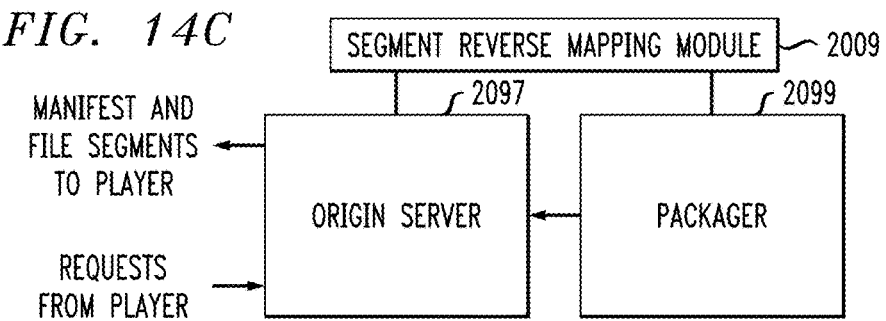

FIG. 13 shows an exemplary configuration of a mobile device 1021 such as a mobile phone, cellular-enabled tablet, or cellular-enabled laptop. Device 1021 includes a suitable processor; e.g., a microprocessor 1151. A cellular transceiver module 1161 coupled to processor 1151 includes an antenna and appropriate circuitry to send and receive cellular telephone signals, e.g., 3G, 4G, or 5G. A Wi-Fi transceiver module 1163 coupled to processor 1151 includes an antenna and appropriate circuitry to allow phone 1021 to connect to the Internet via a wireless network access point or hotspot.

In one or more embodiments, one or more applications ("apps") in memory 1153, when loaded into RAM or other memory accessible to the processor cause the processor 1151 to implement aspects of the functionality described herein. Functionality can also be provided via a browser rather than a stand-alone "app." As noted, in some instances, the player 2008 is an application ("app") running on a smart phone, laptop, desktop, or the like, generally represented by device 1021 or system 700 that allows a user to watch internet-protocol television (IPTV). The segment mapping module 2007, as noted, can hook into the player app via an API or the like.

Touch screen 1165 coupled to processor 1151 is also generally indicative of a variety of I/O devices, all of which may or may not be present in one or more embodiments. Memory 1153 is coupled to processor 1151. Audio module 1167 coupled to processor 1151 includes, for example, an audio coder/decoder (codec), speaker, headphone jack, microphone, and so on. Power management system 1169 can include a battery charger, an interface to a battery, and so on.

It is worth noting that in the video context, an ISP or the like may control both the player and the back end. In one or more embodiments, the player requests segments one at a time, not as a batch. The client software (player) has the job of opening the segments and constituting a buffer. One or more embodiments include one request and one response at a time. Suppose the manifest file 2004 specifies segments 1 through 10. Suppose a simple function is implemented that adds ABCD to each request. Say, the segments requested after the mapping are 1_A, 2_B, .... Suppose further that, due to network conditions/timeouts/error conditions, segment request 3_C is initiated and/or responded to before 2_B. In one or more embodiments, the end application level is tasked with keeping track of the requests so as to form them back in the correct sequence. At the back end, remove the underscore and letter so the requests are interpreted as 1, 2, 3, ... and individually responded back to. The response for the third segment comes before the second but the client needs to read them in the correct sequence. Because of the connectionless nature of the Internet Protocol (IP), issues as discussed in this paragraph could potentially happen and are addressed by the end application level.

Given the discussion thus far, it will be appreciated that, in general terms, an exemplary method, according to an aspect of the invention, includes the step of obtaining, at a first network location (e.g., that of player 2008), a first file (e.g., manifest file 2004) specifying a first plurality of file segments, having a first plurality of original file segment names, to be obtained from a second network location (e.g., that of at least a portion of backend 2012). An additional step includes, at the first network location, mapping each of the first plurality of original file segment names to a first plurality of modified file segment names (see, e.g., FIG. 11). Such mapping can include, for example, shuffling, encryption, or the like. Another step includes sending, from the first network location to the second network location, requests for each of the first plurality of modified file segment names. For example, in FIG. 12, Segment_1.*m*4*s* is modified to Segment_1892.*m*4*s*. Still another step includes obtaining, at the first network location from the second network location, the first plurality of file segments, corresponding to the first plurality of original file segment names, based on the requests for each of the first plurality of modified file segment names and the mapping. Again, for the avoidance of doubt, it is worth noting that in one or more embodiments, the first network location requests segments one at a time, not as a batch, and the client software (e.g., player) has the job of opening the segments and constituting a buffer. Again, one or more embodiments include one request and one response at a time.

One or more embodiments further include obtaining, at the first network location, a second file specifying (e.g., an updated manifest file 2004) a second plurality of file segments, having a second plurality of original file segment names, to be obtained from the second network location; at the first network location, mapping, for each of the second plurality of original file segment names to a second plurality of modified file segment names; sending, from the first network location to the second network location, requests for each of the second plurality of modified file segment names; and obtaining, at the first network location from the second network location, the second plurality of file segments, corresponding to the second plurality of original file segment names, based on the requests for each of the second plurality of modified file segment names and the mapping. In this aspect, the first plurality of file segments and the second plurality of file segments are part of a single asset (e.g., generalized file, live video feed). Further, in one or more embodiments, at any given time, only the first plurality of file segments or the second plurality of file segments, but not both, are available from the second network location. For example, delete un-needed file segments to reduce storage (say, keep only 36 seconds or other predetermined amount in the case of video perhaps up to 2 minutes).

In one or more embodiments, the first network location is an internet protocol television (IPTV) player 2008, the second network location is an internet protocol television (IPTV) back end 2012, the first and second files specifying the first and second pluralities of file segments are respectively first and second manifest files, the single asset is a video asset, the first and second pluralities of file segments are video file segments, and the sending steps include sending over an internet protocol network. Video segments typically include video tracks of audio, video, text and captions. Media segments can be for video assets, audio only assets, etc.

In some instances, the first plurality original file segment names and the second plurality original file segment names include numeric components specifying an order in which the video file segments are to be displayed by the player and the mapping includes shuffling the numeric components. For example, see FIGS. 11 and 12.

As noted, many different kinds of modification can be employed. For example, the mapping can include applying an encryption algorithm, such as applying RSA encryption or another encryption algorithm. In a non-limiting shuffling example, add a letter or number to the segment—this is not encryption per se, but rather modifies the content of the URL/segment request from the manifest. In another aspect, a random number generator could be employed, where the request is incremented/decremented by the random number. The random number could be shared with the back end to carry out "decryption" (i.e., as noted, two random number generators using the same seed value could be employed). Thus, in one or more embodiments, the mapping includes at least one of predetermined incrementing and predetermined decrementing of the numeric components. The mapping could also include mapping the numeric components, as indices, to corresponding identical random numbers generated by random number generators at the first and second network locations, from a shared seed value, as per FIG. 15 and accompanying text.

In one or more embodiments, the first and second pluralities of file segments are themselves encrypted.

One or more embodiments further include obtaining, from the first network location at the second network location, the requests for each of the first plurality of modified file segment names and second plurality of modified file segment names; and responsive to the second network location obtaining the requests for each of the first plurality of modified file segment names and second plurality of modified file segment names from the first network location, the second network location de-mapping (e.g., with module 2009), for each of the first and second pluralities of file segments, the first plurality of modified file segment names and second plurality of modified file segment names back to the first plurality of original file segment names and second plurality of original file segment names. For example, the player maps 1 to 1892, and the module 2009 de-maps 1892 back to 1. A further step includes, based on the de-mapping, the second network location sending to the first network location the first and second pluralities of file segments with the first plurality of original file segment names and the second plurality of original file segment names.

As noted, one or more embodiments are designed to cause a 404 error to a bad actor. In this aspect, for example, additional steps include obtaining, from a network location other than the second network location, at the second network location, a request for at least one of the first plurality of original file segment names and the second plurality of original file segment names; and, responsive to the second network location obtaining the request for the at least one of the first plurality of original file segment names and the second plurality of original file segment names from the network location other than the second network location, the second network location de-mapping, for the at least one of the first plurality original file segment names and the second plurality original file segment names, a corresponding original file segment name to a non-existent file segment name. For example, a bad actor desires Segment_1.*m*4*s* but does not map it to Segment_1892.*m*4*s*. When the back end receives the request, it reverse maps the unmapped request for Segment_1 to a segment number that does not exist. Thus, based on the de-mapping (i.e., of the request that was not mapped), the second network location sends, to the network location other than the second network location, a file-not-found error message.

In one or more embodiments, the second network location deletes the first plurality of file segments before the second plurality of file segments are made available.

One or more embodiments use the TCP/IP protocol, patch over a UDP protocol, or generally use any IP connection or the like.

It is worth noting given the teachings herein, the skilled artisan can adapt known techniques to implement one or more embodiments, such as the use of hashing within RSA, the implementation of buffering, the specification of audio, video, text and captions associated with a given video segment, and the like.

In another aspect, another exemplary method includes making available (e.g., serving), from a second network location to a first network location, a first file specifying a first plurality of file segments, having a first plurality of original file segment names, to be obtained by the first network location from the second network location. A further step includes obtaining, from the first network location at the second network location, requests for each of a first plurality of modified file segment names, the first network location having mapped each of the first plurality of original file segment names to the first plurality of modified file segment names. A still further step includes, responsive to the second network location obtaining the requests for each of the first plurality of modified file segment names from the first network location, the second network location de-mapping, for the first plurality of file segments, the first plurality of modified file segment names back to the first plurality of original file segment names. An even further step includes, based on the de-mapping, the second network location sending to the first network location the first plurality of file segments with the first plurality of original file segment names.

The skilled artisan will appreciate that this aspect is essentially the technique described above, viewed from the perspective of the second network location.

One or more embodiments further include making available (e.g., serving), from the second network location to the first network location, a second file specifying a second plurality of file segments, having a second plurality of original file segment names, to be obtained by the first network location from the second network location. A further step in this aspect includes obtaining, from the first network location at the second network location, requests for each of a second plurality of modified file segment names, the first network location having mapped each of the second plurality of original file segment names to the second plurality of modified file segment names, Still a further step in this aspect includes, responsive to the second network location obtaining the requests for each of the second plurality of modified file segment names from the first network location, the second network location de-mapping, for the second plurality of file segments, the second plurality of modified file segment names back to the second plurality of original file segment names. An even further step in this aspect includes, based on the de-mapping, the second network location sending to the first network location the second plurality of file segments with the second plurality of original file segment names. Yet a further step in this aspect includes the second network location deleting the first plurality of file segments before the second plurality of file segments are made available by sending or the like. In this aspect, the first plurality of file segments and the second plurality of file segments are part of a single asset.

This aspect can, if desired, be applied to IPTV as described above, and/or to the sending of a 404 message responsive to improper request(s), as described above.

Any of the mapping/de-mapping techniques described herein are equally applicable from the perspective of the back end. Thus, when the first plurality of original file segment names and the second plurality of original file segment names include numeric components specifying an order in which the video file segments are to be displayed by the player, the de-mapping includes de-shuffling the numeric components (the numeric components having been shuffled by the first network location). The de-mapping can include at least one of undoing predetermined incrementing and undoing predetermined decrementing of the numeric components, the numeric components having undergone at least one of predetermined incrementing and predetermined decrementing by the first network location. When the first network location has mapped the numeric components, as indices, to corresponding identical random numbers generated by random number generators at the first and second network locations, from a shared seed value, the de-mapping includes de-mapping the corresponding random numbers generated by the random number generator at the second network location back to the numeric components, as indices, from the shared seed value. See FIG. 15. When the first network location has mapped each of the first and second plurality of original file segment names to the corresponding first and second plurality of modified file segment names by applying an encryption algorithm, the de-mapping includes de-mapping in accordance with a corresponding decryption algorithm (e.g., RSA encryption/decryption).

In another aspect, a non-transitory computer readable medium includes processor executable instructions which when executed by a processor cause the processor to perform any one, some, or all of the method steps of any of the methods described herein.

In still another aspect, an apparatus, located at a first network location, includes a memory; and at least one processor, coupled to the memory, and operative to carry out or otherwise facilitate any one, some, or all of the method steps associated with the first network location.

In a further aspect, an apparatus, located at a second network location, includes a memory; and at least one processor, coupled to the memory, and operative to carry out or otherwise facilitate any one, some, or all of the method steps associated with the second network location. Optionally, in this aspect, the memory and the at least one processor at the second network location are at least part of an origin server, and the apparatus further includes a packager, coupled to the origin server, which generates, and provides to the origin server, the first and second files specifying the first and second pluralities of file segments, and the first and second pluralities of file segments. See, e.g., FIGS. 14A-14C and accompanying text.

Any of the techniques disclosed herein can further include reconstructing and consuming the asset at the first network location; for example, playing video or other media in a player application.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine-readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 7:
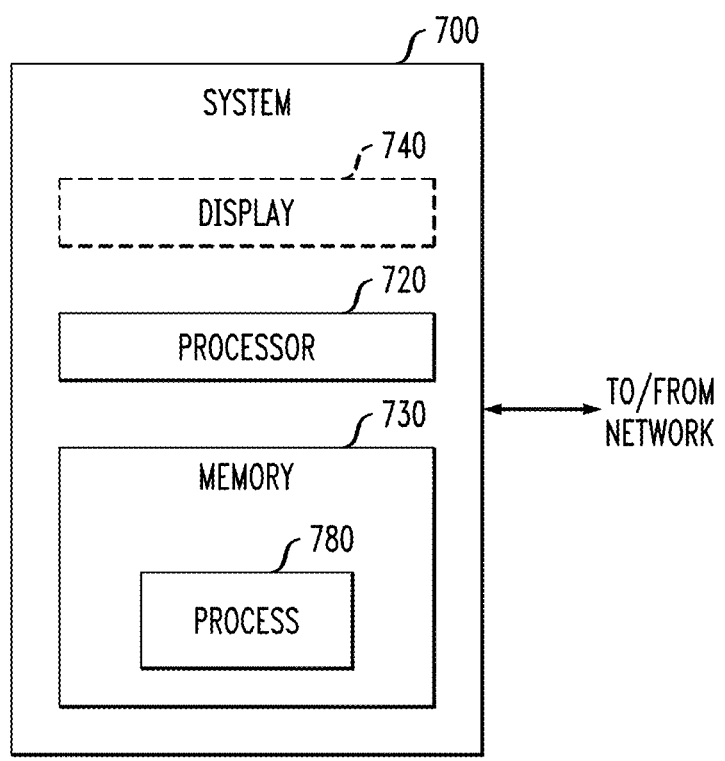
FIG. 7 is a block diagram of a computer system useful in connection with one or more aspects of the invention.

FIG. 7 is a block diagram of at least a portion of an exemplary system 700 that can be configured to implement at least some aspects of the invention, and is representative, for example, of one or more of the apparatuses, servers, or modules shown in the figures. As shown in FIG. 7, memory 730 configures the processor 720 to implement one or more methods, steps, and functions (collectively, shown as process 780 in FIG. 15). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or FPGA rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
    obtaining, at a first network location, a first file specifying a first plurality of file segments, having a first plurality of original file segment names, to be obtained from a second network location;
    at the first network location, mapping each of the first plurality of original file segment names to a first plurality of modified file segment names;
    sending, from the first network location to the second network location, requests for file segments corresponding to each of the first plurality of modified file segment names; and
    obtaining, at the first network location from the second network location, the first plurality of file segments, corresponding to the first plurality of original file segment names, based on: (i) the requests for the file segments corresponding to each of the first plurality of modified file segment names, and (ii) the mapping.

2. The method of claim 1, further comprising:
    obtaining, at the first network location, a second file specifying a second plurality of file segments, having a second plurality of original file segment names, to be obtained from the second network location;
    at the first network location, mapping each of the second plurality of original file segment names to a second plurality of modified file segment names;
    sending, from the first network location to the second network location, requests for file segments corresponding to each of the second plurality of modified file segment names; and
    obtaining, at the first network location from the second network location, the second plurality of file segments, corresponding to the second plurality of original file segment names, based on: (i) the requests for the file segments corresponding to each of the second plurality of modified file segment names, and the (ii) mapping;
    wherein:
    the first plurality of file segments and the second plurality of file segments are part of a single asset; and
    at a given time, only the first plurality of file segments or the second plurality of file segments, but not both, are available from the second network location.

3. The method of claim 2, wherein the first network location comprises an internet protocol television (IPTV) player, the second network location comprises an internet protocol television (IPTV) back end, the first and second files specifying the first and second pluralities of file segments respectively comprise first and second manifest files, the single asset comprises a video asset, the first and second pluralities of file segments comprise video file segments, and the sending steps comprise sending over an internet protocol network.

4. The method of claim 3, wherein the single asset comprises a live video feed.

5. The method of claim 4, wherein the first plurality of original file segment names and the second plurality of original file segment names include numeric components specifying an order in which the video file segments are to be displayed by the player and the mapping includes shuffling the numeric components.

6. The method of claim 5, wherein the mapping comprises at least one of predetermined incrementing and predetermined decrementing of the numeric components.

7. The method of claim 5, wherein the mapping comprises mapping the numeric components, as indices, to corresponding identical random numbers generated by random number generators at the first and second network locations, from a shared seed value.

8. The method of claim 2, wherein the mapping comprises applying an encryption algorithm.

9. The method of claim 8, wherein applying the encryption algorithm comprises applying RSA encryption.

10. The method of claim 2, wherein the first and second pluralities of file segments are themselves encrypted.

11. The method of claim 2, further comprising:
    obtaining, from the first network location at the second network location, the requests for the file segments corresponding to each of the first plurality of modified file segment names and the file segments corresponding to each of the second plurality of modified file segment names;
    responsive to the second network location obtaining the requests for the file segments corresponding to each of the first plurality of modified file segment names and the file segments corresponding to each of the second plurality of modified file segment names from the first network location, the second network location de-mapping, for each of the first and second pluralities of file segments, the first plurality of modified file segment names and second plurality of modified file segment names back to the first plurality of original file segment names and second plurality of original file segment names; and
    based on the de-mapping, the second network location sending to the first network location the first and second pluralities of file segments with the first plurality of original file segment names and the second plurality of original file segment names.

12. The method of claim 11, further comprising:
    obtaining, from a network location other than the second network location, at the second network location, a request for at least one of: (i) the file segments corresponding to the first plurality of original file segment names, and (ii) the file segments corresponding to the second plurality of original file segment names;
    responsive to the second network location obtaining the request for the at least one of: (i) the file segments corresponding to the first plurality of original file segment names, and (ii) the file segments corresponding to the second plurality of original file segment names from the network location other than the second network location, the second network location de-mapping, for the at least one of the first plurality of original file segment names and the second plurality of original file segment names, a corresponding original file segment name to a non-existent file segment name; and
    based on the de-mapping, the second network location sending to the network location other than the second network location, a file-not-found error message.

13. The method of claim 11, further comprising the second network location deleting the first plurality of file segments before the second plurality of file segments are made available.

14. A method comprising:
    making available, from a second network location to a first network location, a first file specifying a first plurality of file segments, having a first plurality of original file segment names, to be obtained by the first network location from the second network location;

obtaining, from the first network location at the second network location, requests for file segments corresponding to each of a first plurality of modified file segment names, the first network location having mapped each of the first plurality of original file segment names to the first plurality of modified file segment names;

responsive to the second network location obtaining the requests for the file segments corresponding to each of the first plurality of modified file segment names from the first network location, the second network location de-mapping, for the first plurality of file segments, the first plurality of modified file segment names back to the first plurality of original file segment names; and based on the de-mapping, the second network location sending to the first network location the first plurality of file segments with the first plurality of original file segment names.

15. The method of claim 14, further comprising:

making available, from the second network location to the first network location, a second file specifying a second plurality of file segments, having a second plurality of original file segment names, to be obtained by the first network location from the second network location;

obtaining, from the first network location at the second network location, requests for file segments corresponding to each of a second plurality of modified file segment names, the first network location having mapped each of the second plurality of original file segment names to the second plurality of modified file segment names;

responsive to the second network location obtaining the requests for the file segments corresponding to each of the second plurality of modified file segment names from the first network location, the second network location de-mapping, for the second plurality of file segments, the second plurality of modified file segment names back to the second plurality of original file segment names;

based on the de-mapping, the second network location sending to the first network location the second plurality of file segments with the second plurality of original file segment names; and the second network location deleting the first plurality of file segments before the second plurality of file segments are sent;

wherein the first plurality of file segments and the second plurality of file segments are part of a single asset.

16. The method of claim 15, wherein the first network location comprises an internet protocol television (IPTV) player, the second network location comprises an internet protocol television (IPTV) back end, the first and second files specifying the first and second pluralities of file segments respectively comprise first and second manifest files, the single asset comprises a video asset, the first and second pluralities of file segments comprise video file segments, and the sending steps comprise sending over an internet protocol network.

17. The method of claim 16, wherein the single asset comprises a live video feed.

18. The method of claim 17, wherein the first plurality of original file segment names and the second plurality of original file segment names include numeric components specifying an order in which the video file segments are to be displayed by the player and the de-mapping includes de-shuffling the numeric components, the numeric components having been shuffled by the first network location.

19. The method of claim 18, wherein the de-mapping comprises at least one of undoing predetermined incrementing and undoing predetermined decrementing of the numeric components, the numeric components having undergone at least one of predetermined incrementing and predetermined decrementing by the first network location.

20. The method of claim 18, wherein the first network location has mapped the numeric components, as indices, to corresponding identical random numbers generated by random number generators at the first and second network locations, from a shared seed value, and wherein the de-mapping comprises de-mapping the corresponding random numbers generated by random number generator at the second network location back to the numeric components, as indices, from the shared seed value.

21. The method of claim 15, wherein the first network location has mapped each of the first and second plurality of original file segment names to the corresponding first and second plurality of modified file segment names by applying an encryption algorithm, and wherein the de-mapping comprises de-mapping in accordance with a corresponding decryption algorithm.

22. The method of claim 21, wherein the encryption and decryption comprise RSA encryption and decryption.

23. The method of claim 15, wherein the first and second pluralities of file segments are themselves encrypted.

24. The method of claim 15, further comprising:

obtaining, from a network location other than the second network location, at the second network location, a request for at least one of: (i) the file segments corresponding to the first plurality of original file segment names, and (ii) the file segments corresponding to the second plurality of original file segment names;

responsive to the second network location obtaining the request for the at least one of: (i) the file segments corresponding to the first plurality of original file segment names, and (ii) the file segments corresponding to the second plurality of original file segment names from the network location other than the second network location, the second network location de-mapping, for the at least one of the first plurality of original file segment names and the second plurality of original file segment names, a corresponding original file segment name to a non-existent file segment name; and based on the de-mapping, the second network location sending to the network location other than the second network location, a file-not-found error message.

25. A non-transitory computer readable medium comprising processor executable instructions which when executed by a processor cause the processor to perform a method of:

obtaining, at a first network location, a first file specifying a first plurality of file segments, having a first plurality of original file segment names, to be obtained from a second network location;

at the first network location, mapping each of the first plurality of original file segment names to a first plurality of modified file segment names;

sending, from the first network location to the second network location, requests for file segments corresponding to each of the first plurality of modified file segment names; and obtaining, at the first network location from the second network location, the first plurality of file segments, corresponding to the first plurality of original file segment names, based on: (i) the requests for the file segments corresponding to each of the first plurality of modified file segment names, and (ii) the mapping.

26. A non-transitory computer readable medium comprising processor executable instructions which when executed by a processor cause the processor to perform a method of:
making available, from a second network location to a first network location, a first file specifying a first plurality of file segments, having a first plurality of original file segment names, to be obtained by the first network location from the second network location;
obtaining, from the first network location at the second network location, requests for file segments corresponding to each of a first plurality of modified file segment names, the first network location having mapped each of the first plurality of original file segment names to the first plurality of modified file segment names;
responsive to the second network location obtaining the requests for the file segments corresponding to each of the first plurality of modified file segment names from the first network location, the second network location de-mapping, for the first plurality of file segments, the first plurality of modified file segment names back to the first plurality of original file segment names; and
based on the de-mapping, the second network location sending to the first network location the first plurality of file segments with the first plurality of original file segment names.

27. An apparatus located at a first network location, the apparatus comprising:
a memory; and
at least one processor, coupled to the memory, and operative to:
obtain, at the first network location, a first file specifying a first plurality of file segments, having a first plurality of original file segment names, to be obtained from a second network location;
at the first network location, map each of the first plurality of original file segment names to a first plurality of modified file segment names;
send, from the first network location to the second network location, requests for file segments corresponding to each of the first plurality of modified file segment names; and
obtain, at the first network location from the second network location, the first plurality of file segments, corresponding to the first plurality of original file segment names, based on: (i) the requests for the file segments corresponding to each of the first plurality of modified file segment names, and (ii) the mapping.

28. The apparatus of claim 27, wherein the at least one processor is further operative to:
obtain, at the first network location, a second file specifying a second plurality of file segments, having a second plurality of original file segment names, to be obtained from the second network location;
at the first network location, map each of the second plurality of original file segment names to a second plurality of modified file segment names;
send, from the first network location to the second network location, requests for file segments corresponding to each of the second plurality of modified file segment names; and
obtain, at the first network location from the second network location, the second plurality of file segments, corresponding to the second plurality of original file segment names, based on: (i) the requests for each of the second plurality of modified file segment names, and (ii) the mapping;
wherein:
the first plurality of file segments and the second plurality of file segments are part of a single asset; and
at a given time, only the first plurality of file segments or the second plurality of file segments, but not both, are available from the second network location.

29. An apparatus located at a second network location, the apparatus comprising:
a memory; and
at least one processor, coupled to the memory, and operative to:
make available, from the second network location to a first network location, a first file specifying a first plurality of file segments, having a first plurality of original file segment names, to be obtained by the first network location from the second network location;
obtain, from the first network location at the second network location, requests for file segments corresponding to each of a first plurality of modified file segment names, the first network location having mapped each of the first plurality of original file segment names to the first plurality of modified file segment names;
responsive to the second network location obtaining the requests for the file segments corresponding to each of the first plurality of modified file segment names from the first network location, de-map, at the second network location, for the first plurality of file segments, the first plurality of modified file segment names back to the first plurality of original file segment names; and
based on the de-mapping, send, from the second network location to the first network location, the first plurality of file segments with the first plurality of original file segment names.

30. The apparatus of claim 29, wherein the at least one processor is further operative to:
make available, from the second network location to the first network location, a second file specifying a second plurality of file segments, having a second plurality of original file segment names, to be obtained by the first network location from the second network location;
obtain, from the first network location at the second network location, requests for file segments corresponding to each of a second plurality of modified file segment names, the first network location having mapped each of the second plurality of original file segment names to the second plurality of modified file segment names;
responsive to the second network location obtaining the requests for the file segments corresponding to each of the second plurality of modified file segment names from the first network location, de-map, at the second network location, for the second plurality of file segments, the second plurality of modified file segment names back to the second plurality of original file segment names; and
based on the de-mapping, send, from the second network location to the first network location, the second plurality of file segments with the second plurality of original file segment names; and delete, from the second network location, the first plurality of file segments before the second plurality of file segments are sent;
wherein the first plurality of file segments and the second plurality of file segments are part of a single asset.

31. The apparatus of claim 30, wherein the memory and the at least one processor at the second network location are at least part of an origin server, further comprising a packager, coupled to the origin server, which generates, and provides to the origin server, the first and second files specifying the first and second pluralities of file segments, and the first and second pluralities of file segments.

\* \* \* \* \*